(12) United States Patent
Axe et al.

(10) Patent No.: US 7,568,155 B1
(45) Date of Patent: Jul. 28, 2009

(54) VISUAL CONFIGURATOR

(75) Inventors: Christopher E. Axe, San Jose, CA (US); Marco S. Casalaina, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2135 days.

(21) Appl. No.: 09/636,418

(22) Filed: Aug. 10, 2000

(51) Int. Cl.
*G06F 17/00* (2006.01)
(52) U.S. Cl. .................. 715/246; 715/243; 715/244
(58) Field of Classification Search .............. 715/517, 715/518, 520, 521, 539, 200, 243, 244, 246, 715/247, 272; 717/107
See application file for complete search history.

(56) References Cited

U.S. PATENT DOCUMENTS

| | | | | |
|---|---|---|---|---|
| 5,438,512 A * | 8/1995 | Mantha et al. | ............... | 715/517 |
| 5,499,366 A * | 3/1996 | Rosenberg et al. | ............. | 707/4 |
| 5,600,771 A * | 2/1997 | Hayashi et al. | ............. | 715/517 |
| 5,669,006 A * | 9/1997 | Joskowicz et al. | .......... | 715/517 |
| 5,745,765 A * | 4/1998 | Paseman | .................... | 717/107 |
| 5,845,303 A * | 12/1998 | Templeman | ............... | 715/517 |
| 5,953,733 A * | 9/1999 | Langford-Wilson | ......... | 715/517 |
| 6,038,597 A * | 3/2000 | Van Wyngarden | .......... | 709/219 |
| 6,161,114 A * | 12/2000 | King et al. | .................. | 715/517 |
| 6,167,383 A * | 12/2000 | Henson | ....................... | 705/26 |
| 6,216,142 B1 * | 4/2001 | Iwasaki | ...................... | 715/517 |
| 6,288,719 B1 * | 9/2001 | Squilla et al. | ................ | 345/805 |
| 6,434,579 B1 * | 8/2002 | Shaffer et al. | ............... | 715/520 |
| 6,578,013 B1 * | 6/2003 | Davis et al. | .................. | 705/26 |
| 6,596,032 B2 * | 7/2003 | Nojima et al. | ............... | 715/517 |
| 6,598,223 B1 * | 7/2003 | Vrhel et al. | ................. | 717/174 |
| 6,694,365 B1 * | 2/2004 | Wyngarden | ................. | 709/225 |

OTHER PUBLICATIONS

Statement Regarding Demonstration of a Prototype Visual Configurator; Feb. 4, 2002.
Stacy, Don; "Visio-based Configurator Overview", Feb. 18, 1998.

* cited by examiner

*Primary Examiner*—Stephen S Hong
*Assistant Examiner*—Gregory J Vaughn
(74) *Attorney, Agent, or Firm*—Townsend and Townsend and Crew LLP

(57) ABSTRACT

A method, system, and computer program product for addressing a general class of configuration problems requiring visual placement. Such configuration problems are solved as a single group using a visual user interface which guides the users' behavior. The present invention may be implemented over the Internet for rapid and efficient distribution without any additional software on the client side other than a web browser. The inference engine may be on a remote server. The client side device may include a visual user interface as well as a small amount of user side intelligence. In one embodiment, a visual interface on the client device helps the user create a product comprised of selectable components, where each component is placed where the user wants it. Since the client device contains some amount of user intelligence, the client device does not need to send an entire web page to the inference engine, and receive an entire new web page from the inference engine, every time a user selects a component. Instead, once a user makes a selection, the client device can merely send over to the inference engine, the component selected, and the desired placement of the component. The inference engine, in turn, can merely send over information regarding which slots are constrained and how. The client device may include a web-browser, via which it can communicate with the inference engine over the Internet.

27 Claims, 10 Drawing Sheets

VISUAL CONFIGURATOR

BACKGROUND

A. Technical Field

The present invention relates to the configuration of products using selectable components, and more particularly to a visual configurator.

B. Background of the Invention

Several products offered for sale nowadays are composed of multiple selectable components which can be put together in various different configurations. When a consumer desires to purchase such a configurable product, she needs to communicate to the supplier of the product, which specific product configuration she wants. For instance, a computer system is an example of a configurable product, which comprises various selectable components, such as monitors, processors, memories, sound cards, printers, etc. A user can thus create a particular customized computer system by selecting a certain monitor, a certain processor, a certain memory, a certain sound card, a certain printer, and so on. It is, however, often the case that each component has specific properties which can be used advantageously with some other components, but which make the component incompatible for use with yet other components. Therefore, there are often constraints on which combinations of components can be selected. For example, selecting a particular processor may constrain the user's selection of the memory for a computer system. With an increase in the number of selectable components, as well as in the constraints governing the combinations of selections, decision-making by the consumer, and communication of those decisions to the suppliers, can get increasingly complicated.

These complications further increase when, instead of by face-to-face communications, the communications take place remotely, for instance over the phone or over the Internet. The increased popularity of e-commerce, and the willingness of consumers to purchase configurable products over the Internet, necessitate the facilitation of such communication. Nowadays, consumers often shop at a supplier's Internet web page (referred to as an "e-store"). In many cases, as a consumer browses through the e-store, products are visually and descriptively displayed, thereby allowing the user to have a virtual shopping experience. Once the consumer finds a product that she is interested in purchasing, she must configure the product to her exact liking. Depending on the product, the configuration may be fairly simple (e.g., selecting a color or size of the product), to fairly complex (e.g., a computer system or automobile). Regardless of the configuration complexity, in such remote communication environments, a configuration tool must be implemented to stand in the place of a human supplier.

Conventionally, such a configuration tool uses a user-interface (UI) with text menus. In some conventional system, each component typically has a drop-down menu of its own. As various components are selected, particular selections for some other components may get "grayed out" (that is they cannot be selected by the consumer) because they are incompatible with previously selected components. For instance, if a consumer shopping for a computer identifies the PENTIUM™ processor as the desired central processing unit (CPU) for the computer they wish to purchase, the available random access memory (RAM) feature of that computer may then be limited to 32 M-bytes or more. Thus, any RAM option having less than 32 M-bytes would be removed from the available features list by the configuration engine. The UI would reflect this by graying out options of less than 32M-bytes of RAM, and thus not letting the consumer choose them.

One problem with such conventional systems is that they often implement all of the intelligence (also known as the "inference engine") on a remote server, separate from the client device on which the user interface is displayed. The client device and remote server are typically linked by the Internet, by means of a web-browser on the client device. Every time the user makes a selection of a component, the entire web page is sent over to the server, which checks the new state of the configurable product against all the constraints stored in the inference engine. The remote server then sends a whole new page back to the client device, validating or invalidating the user's choice of the selectable component. Because a whole page (that is a large amount of information) must be sent back and forth from the client device to the remote server over the Internet each time that a user selects a component, this process becomes extremely time consuming, especially when the network is congested.

Another problem with conventional systems is that such configurators cannot deal with problems requiring physical placement of objects. The special class of configuration problems which require a visual representation has not been previously appreciated. Such configuration problems require visual feedback, because in these cases physical placement of components is a required element in the configuration of a product. Such configuration problems can include configuration of gardens, aircraft control panels, computer networks, rack mounted computer systems, etc.

One solution to a problem involving visual configuration has included providing a UI which addressed one specific configurable problem—that of dispatch systems such as 911 emergency systems, where the relative positioning of switches, routers, and power supplies has a bearing on the system's ability to function. However, this solution addressed only the particular problem it was designed for, and could not be adapted to solve any other configuration problems involving visual placement. That is, the previous solutions did not address such physical placement configuration problems as a general class of problems requiring a general solution. In addition, this solution was based entirely on a single server, and could not be accessed from remote locations.

Thus there exists a need for a configurator which can be used with the general class of problems requiring physical placement. Further, there exists a need for such a configurator that stores most of its intelligence at a remote location, and can thus be accessed easily from multiple locations, but which utilizes a measure of client-side processing to provide user guided behavior in a fast and efficient manner.

SUMMARY OF THE INVENTION

The present invention overcomes the limitations of the prior art by addressing a general class of configuration problems requiring visual placement. Such configuration problems are solved as a single group using a visual user interface which guides the users behavior. Further, a system in accordance with the present invention is implemented over the Internet for rapid and efficient distribution without any additional software on the client side other than a web browser.

In a system in accordance with the present invention, the inference engine itself may be on a remote server. The client side device may include a visual user interface as well as a small amount of user side intelligence. In one embodiment, the user interface comprises various components that can be selected by the user (called "donors"), and various slots in which they can be placed (called "receptors"). The user can place donors in receptors in a manner corresponding to the physical placement in which the user wants to place the selected components. In this way, in one embodiment, such a visual interface helps the user create a product comprised of selectable components, where each component is placed where the user wants it. An example of such an embodiment is an aircraft control panel. The user can determine, for instance, where each instrument and control should be placed. In another embodiment, such a visual interface may help the user simply create an arrangement of various selectable components. An example of such an embodiment is a garden. The user can use a system in accordance with the present invention to create the layout of a garden. For instance, he can determine which kinds of flowers to plant in which beds. One skilled in the art will note that these are merely examples, and that a system in accordance with the present invention can be used for any type of problem where visual placement is necessary or desirable.

Since the client device contains some amount of user intelligence, the client device does not need to send an entire web page to the inference engine, and receive an entire new web page from the inference engine, every time a user selects a component. Instead, once a user makes a selection, the client device can merely send over the donor and receptor slot that is selected by the user. The inference engine, in turn, can merely send over information regarding which slots are constrained and how. The client device may include a web-browser, via which it can communicate with the inference engine over the Internet.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter. Resort to the claims is necessary to determine such inventive subject matter.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Embodiments of the present invention are now described with reference to figures where like reference numbers indicate identical or functionally similar elements and the leftmost digit(s) of each reference number corresponds to the figure in which the reference number is first used.

System Architecture

Figure 1:
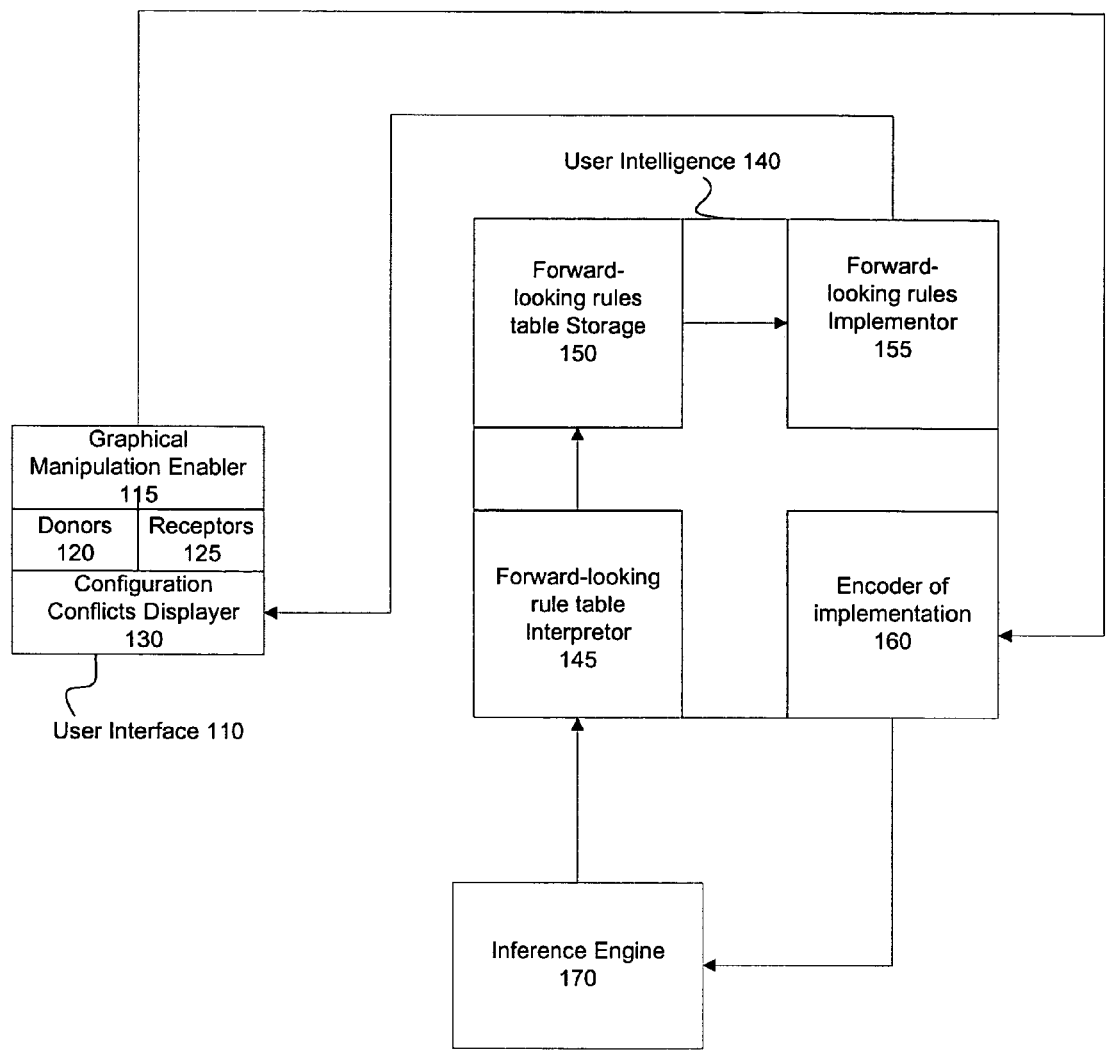
FIG. 1 is a block diagram of a system in accordance with one embodiment of the present invention.

FIG. 1 depicts a system in accordance with the present invention. It comprises the user interface 110 and the user intelligence 140. In addition, FIG. 1 also shows an inference engine 170 (also called "server side intelligence").

Figure 2:
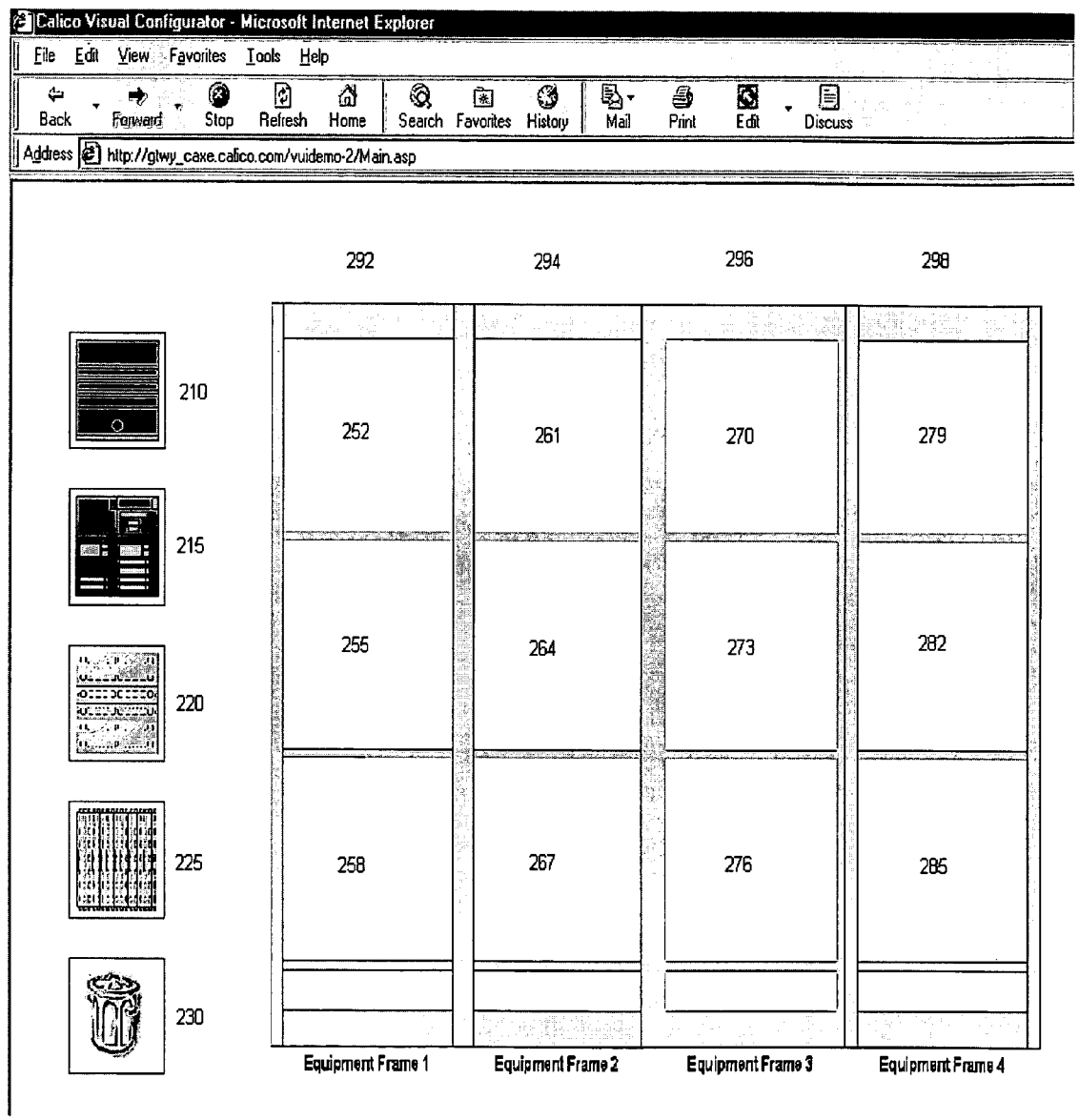
FIG. 2 is a screenshot illustrating donors and receptors in one possible user interface.

The user interface 110 comprises a graphical manipulation enabler 115, donors 120, receptors 125, and a configuration conflicts displayer 130. The graphical manipulation enabler 115 enables the user in manipulating donors and receptors on the user interface. Donors 120 denote the set of selectable components that the user can choose from. Receptors 125 denote the set of slots into which the user can choose to place the selected components. FIG. 2 depicts several donors 210, 215, 220, 225, and 230, and several receptors 252-285. The receptors 252-285 are in four different Equipment Frames 292, 294, 296, and 298. The configuration conflicts displayer 130 provides the user with an indication when the user's placement of components in receptors violates one or more rules. The working of the configuration conflicts displayer 130 is discussed in more detail below.

Figure 3:
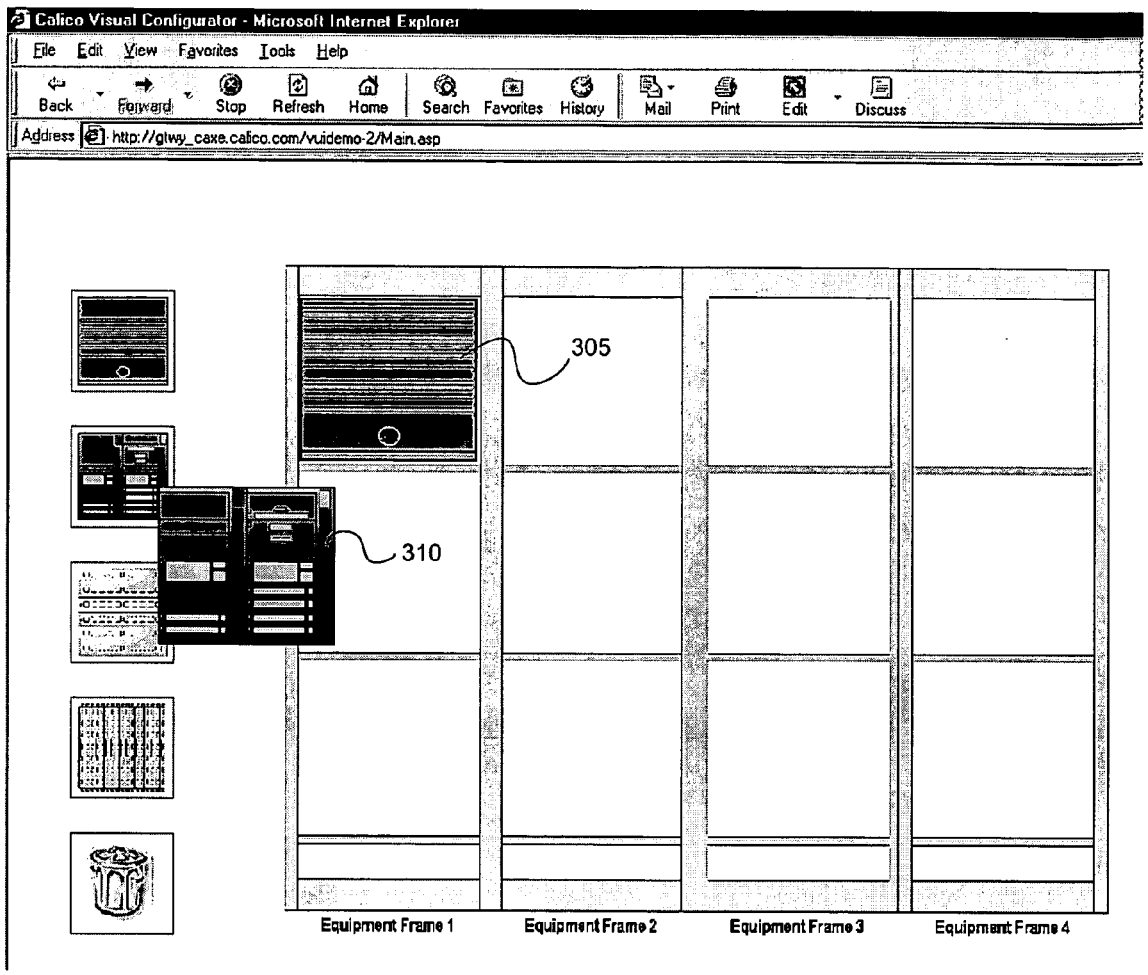
FIG. 3 is a screenshot illustrating objects being placed in slots.

As mentioned above, the graphical manipulation enabler 115 permits manipulation of the donors into various receptors. This can be seen in FIG. 3, where an instance 305 of donor 210 is placed into receptor 252. In addition, FIG. 3 also depicts that an instance 310 of donor 215 has been chosen by the user, and the user is in the process of determining where to place it. An object corresponding to the donor 215 type is created in the user interface 110 by the graphical manipulation enabler 115. Thus, the user has the capability of manipulating the object and placing it where required. In one embodiment, the user can manipulate objects by using a mouse. More specifically, a user can manipulate objects by pressing a mouse button down, moving the mouse, and releasing the mouse button.

When the user presses the mouse button down, the coordinates of the location of the mouse are determined. Based on these values, it can be determined whether the user has clicked on an existing object in a receptor 252-285, or a donor 120, or empty space. If the user clicks on an existing object, that object is designated as the current "drag" object, which the user is then able to reposition. If the user clicks on a donor 120, an object corresponding to that donor 120 type is created, and then designated as the current "drag" object, which the user is then able to reposition. If the user clicks on empty space, nothing happens.

When the user moves the mouse, a corresponding visual update of the object must be performed. That is, the object designated as the current "drag" object, if any, must move along with the mouse.

When the mouse button is released, the graphical manipulation enabler 115 first determines the coordinates of the location of the mouse at the point of release. Based on these values, the user either drops the object on to a new location, drops the object into the recycle bin, or drops the object onto an invalid location. The details of how the invalidity of a receptor 125 is determined is discussed below.

The inference engine 170 may, in one embodiment, be located on a remote server. The inference engine 170 contains the server side intelligence. In one embodiment of the present invention, the inference engine may include all the constraints and rules regarding what component can or cannot be placed in what slots, depending on what components have already been selected, and what slots they have been placed in. In addition, relationships are also stored on the inference engine 170 along with the rules and constraints. Relationships define how two or more objects interact with each other.

The user intelligence 140 comprises a forward-looking rules table interpreter 145, a forward-looking rules storage 150, a forward-looking rules implementor 155, and an encoder 160. The user intelligence 140 performs the functions of sending data to the inference engine 170, receiving data from the inference engine 170, interpreting the data based on the state of the user interface, and implementing constraints specified in the forward-looking rules.

The user intelligence 140 receives a forward-looking rules table. In one embodiment of the present invention, this forward-looking rules table is sent to the user intelligence 140 by the inference engine 170. In order to understand what a forward-looking rules table is, one should note that while an inference engine may store many rules pertaining to many different configuration states, only one configuration state can exist at a time. Thus only a small subset of rules apply to the configuration state that is selected at any given time. A forward-looking rules table is a dynamically created repository for all possible results of a single future move from the current configuration state. That is, a forward-looking rules table includes the rules for all the moves that can be reached within one selection from a given (or currently selected) configuration state. A forward-looking rules table is created based on the components selected by the user, and their placements. Based on each new selection and placement by a user, a new forward-looking rules table is created which lists the constraints on the next selection by the user. That is, the forward-looking rules table identifies which slots may or may not be occupied by which particular objects in the next selection by the user. The following table illustrates one example of a forward-looking rules table.

TABLE 1

| Objects | Slots | | | |
|---------|----------|----------|----------|----------|
|         | Slot (0,0) | Slot (0,1) | Slot (1,0) | Slot (1,1) |
| Object 2 | 1 | 0 | 1 | 0 |
| Object 3 | 0 | 0 | 1 | 0 |
| Object 4 | 1 | 0 | 1 | 1 |
| Object 5 | 1 | 0 | 1 | 0 |

The numbers following the word "slot" represent the position of the slots in the X and the Y axes respectively. Thus the physical configuration of the slots may look as follows:

TABLE 2

| Slot (0,1) | Slot (1,1) |
| [Object 1 has been placed here] | |
| Slot (0,0) | Slot (1,0) |

Table 1 above represents an embodiment in which the 0s or 1s in the grid represent whether or not a particular object can be placed within a specific slot. A 0 in the grid indicates that the rules do not permit placing that specific object in that particular slot, while a 1 indicates that the specific object can be placed in that particular slot. The particular example of the forward-looking rules table above illustrates a case where object 1 has already been placed in slot (0,1). Thus slot (0,1) can not be occupied by any other object. This is represented by the 0s under the slot (0,1) column.

As discussed above, forward-looking rules table is received by the user intelligence 140 after the user selects a component and places it in a slot. The forward-looking rules interpretor 145 then interprets this table. In one embodiment, the interpretation involves converting the forward-looking rules table to an array of boolean values corresponding to the available receptors and donors. Each member of this array indicates whether its corresponding donor/receptor pair is to be constrained, should the user attempt to make that selection. Once the forward-looking rules table has been interpreted, this interpretation gets stored in the forward-looking rules table storage 150. The forward-looking rules implementor 155 then accesses these stored rules when required. In one embodiment, this requirement arises when the user makes the next selection. A system in accordance with one embodiment of the present invention must ascertain whether this next selection is a valid one or not, based on the forward-looking rules that it has stored in the forward-looking rules storage 150.

If the selection is not valid (that is, it is not permitted by the forward-looking rules table), this may be displayed on the user-interface 110, by the configuration conflicts displayer 130. Thus the user interface 110 helps the user visualize almost instantaneously whether or not her choice of the selected component and/or its placement is valid. Such user-guided behavior can be instrumental in helping the user rectify her selection right away.

Figure 4:
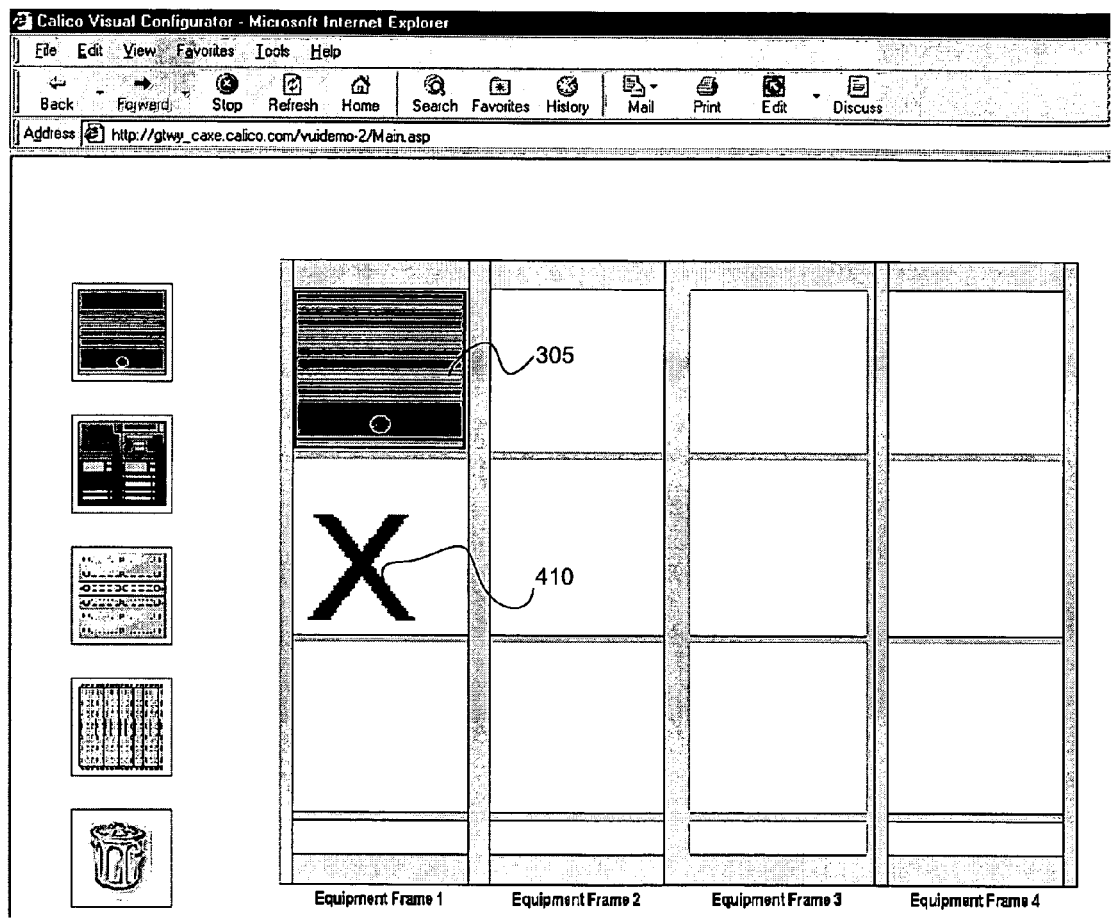
FIG. 4 is a screenshot illustrating a visual indication that some constraint is violated by the placement of the objects.
Figure 5:
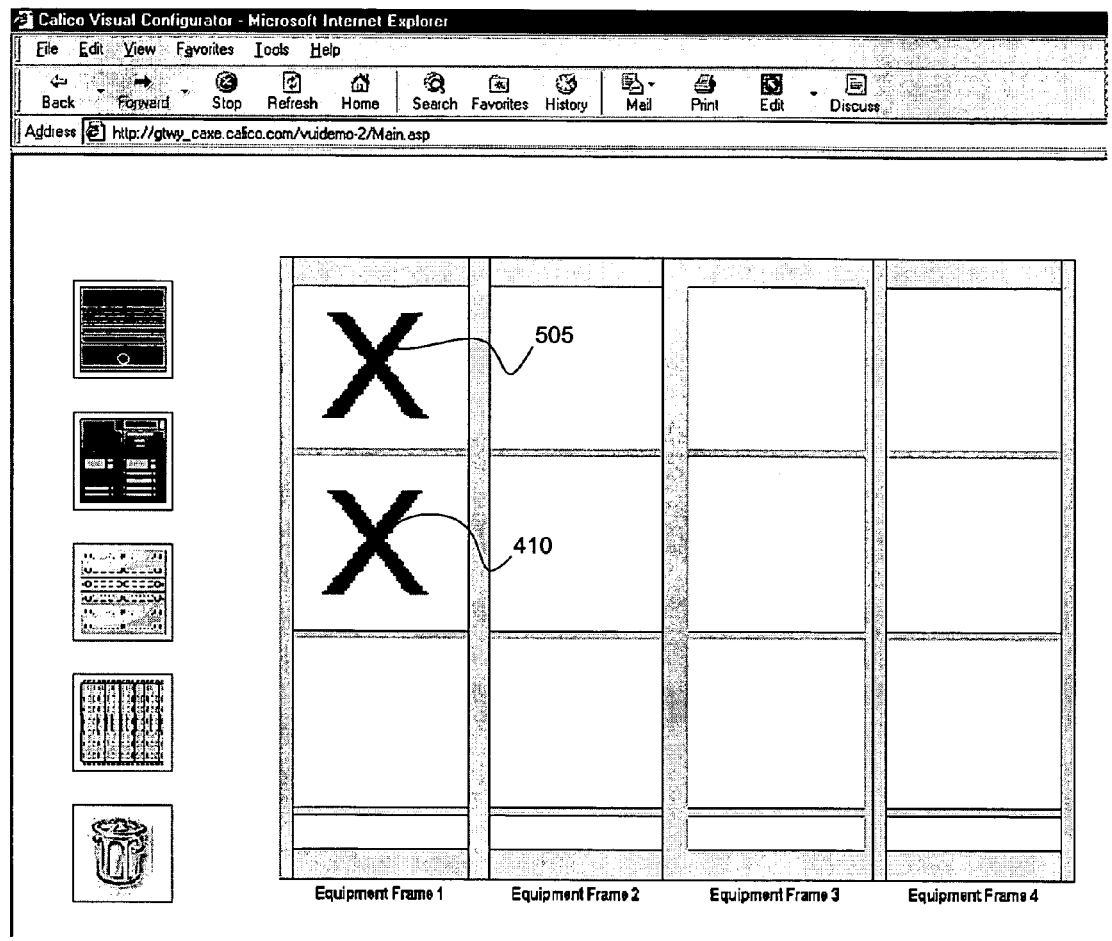
FIG. 5 is a screenshot further illustrating a visual indication that some constraint is violated by the placement of the objects.
Figure 6:
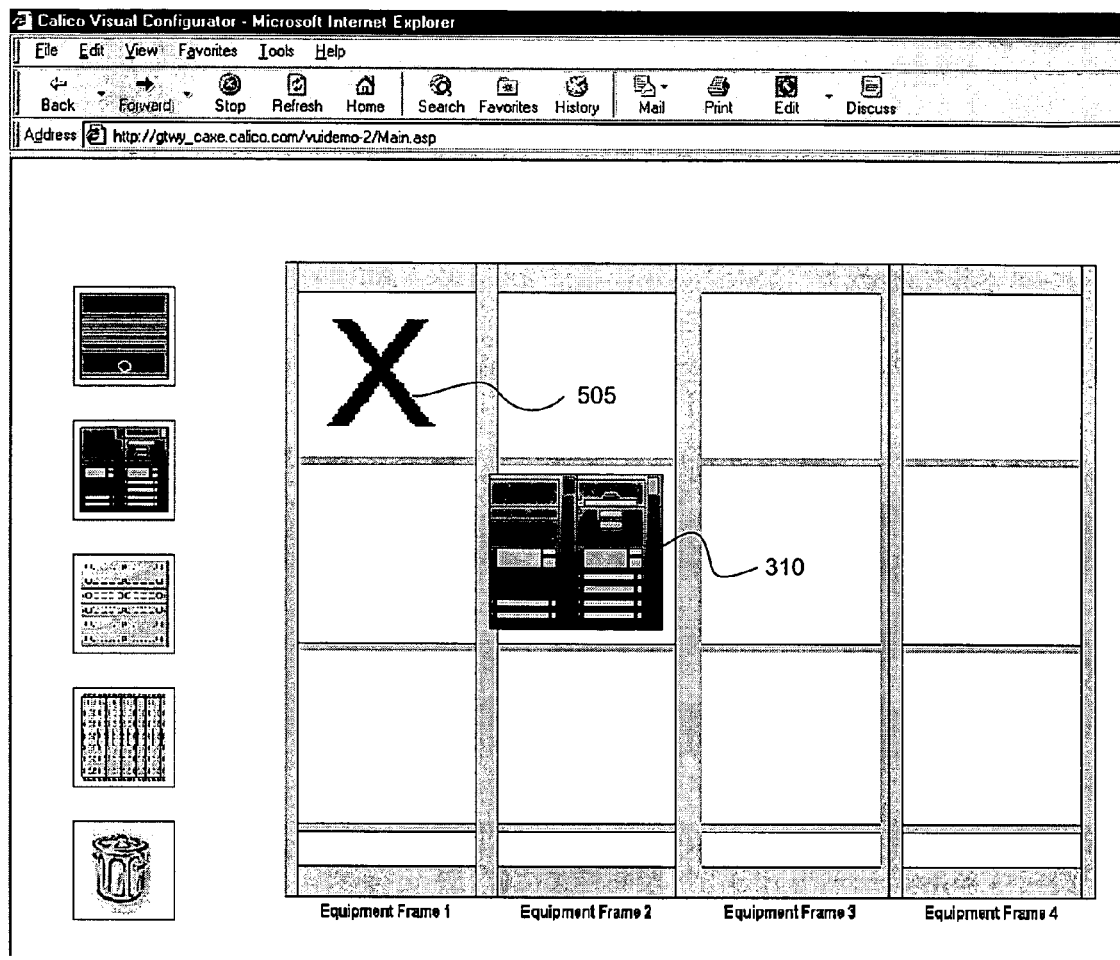
FIG. 6 is a screenshot illustrating a visual update in a possible user interface.
Figure 7:
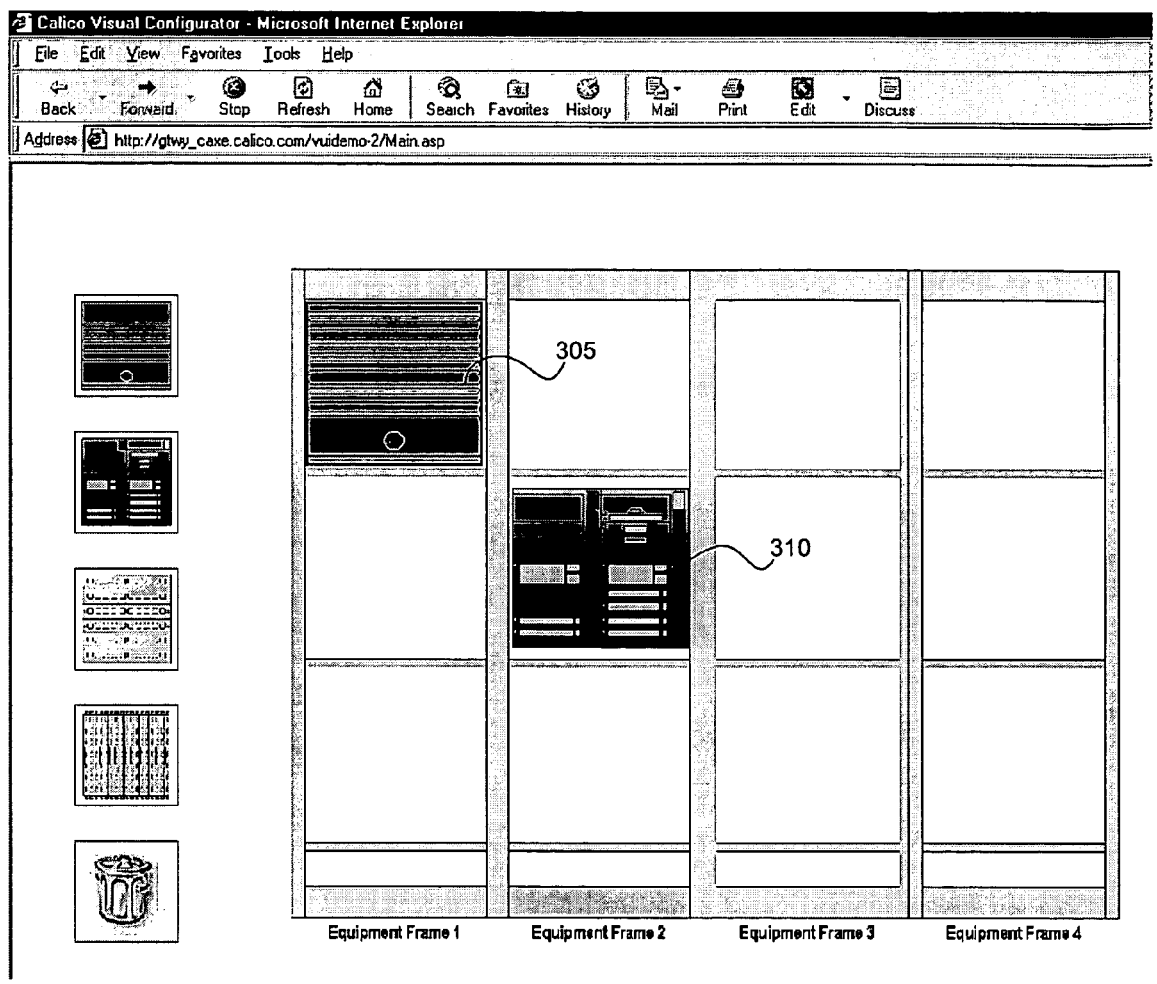
FIG. 7 is a screenshot further illustrating a visual update in a possible user interface.

FIG. 4 illustrates an example of such user-guided behavior. It can be seen from FIG. 3 that the user selected donor 215 to place in the middle slot of Equipment Frame 1. However, as the object moves over the middle slot of Equipment Frame 1, the user receives an indication that this placement is not permissible, as it would result in a violation of the forward-looking rules. This is evidenced by the cross mark 410 instead of the object in FIG. 4. The user now has a chance to amend her selection. In one embodiment of the present invention, the user may not be permitted to violate a forward-looking rule at all, and may not be allowed, for example, to place donor 215 in the middle slot of Equipment Frame 1, once donor 210 has already been placed in the top slot of Equipment Frame 1. In another embodiment of the present invention, the user may be permitted to violate a forward-looking rule, but the objects which violates a constraint may continue to appear different (for example, an X 410), so as to remind the user that a constraint has been violated. This can be seen in FIG. 5, where both the objects appear as Xs 505 and 410. In FIG. 6, the user is in the process of dragging an object 310 away from the position which caused the constrained state. The reason there is still an X 505 in the upper left corner is that the user hasn't finished dragging yet, so she has not actually moved out of the constrained state yet. The auction is not complete until she drops the object somewhere, be it in another slot or in the trash. In FIG. 7 the user has completed the action and dropped the object 310 in another slot, which moved the configurator into a state that is not constrained. Thus in FIG. 7, the X is not visible any more. Instead, all objects 305, 310 can now be seen again.

When the user makes a selection via the graphical manipulation enabler 115, this information may be transmitted to the implementation encoder 160. The implementation encoder 160 encodes the current state of the user interface 110, and may, in one embodiment, transmit the information to the inference engine 170. In one embodiment, the implementation encoder 160 transmits the information to the inference engine 170 whether or not the selection is valid. The inference engine 170 can then construct the next forward-looking rules table based on this latest selection by the user, which may, in turn, be sent to the user intelligence 140.

In one embodiment of a system in accordance with the present invention, the system may be implemented over the Internet. This is further described below with reference to FIGS. 9A, 9B and 10. In an embodiment, the user interface 110 code may be in one browser frame, and the user intelligence 140 code may be in another browser frame. In an embodiment of the present invention, the browser frame in which the user intelligence 140 code resides may be hidden, and may not be visible to the user.

System Operation

Figure 8:
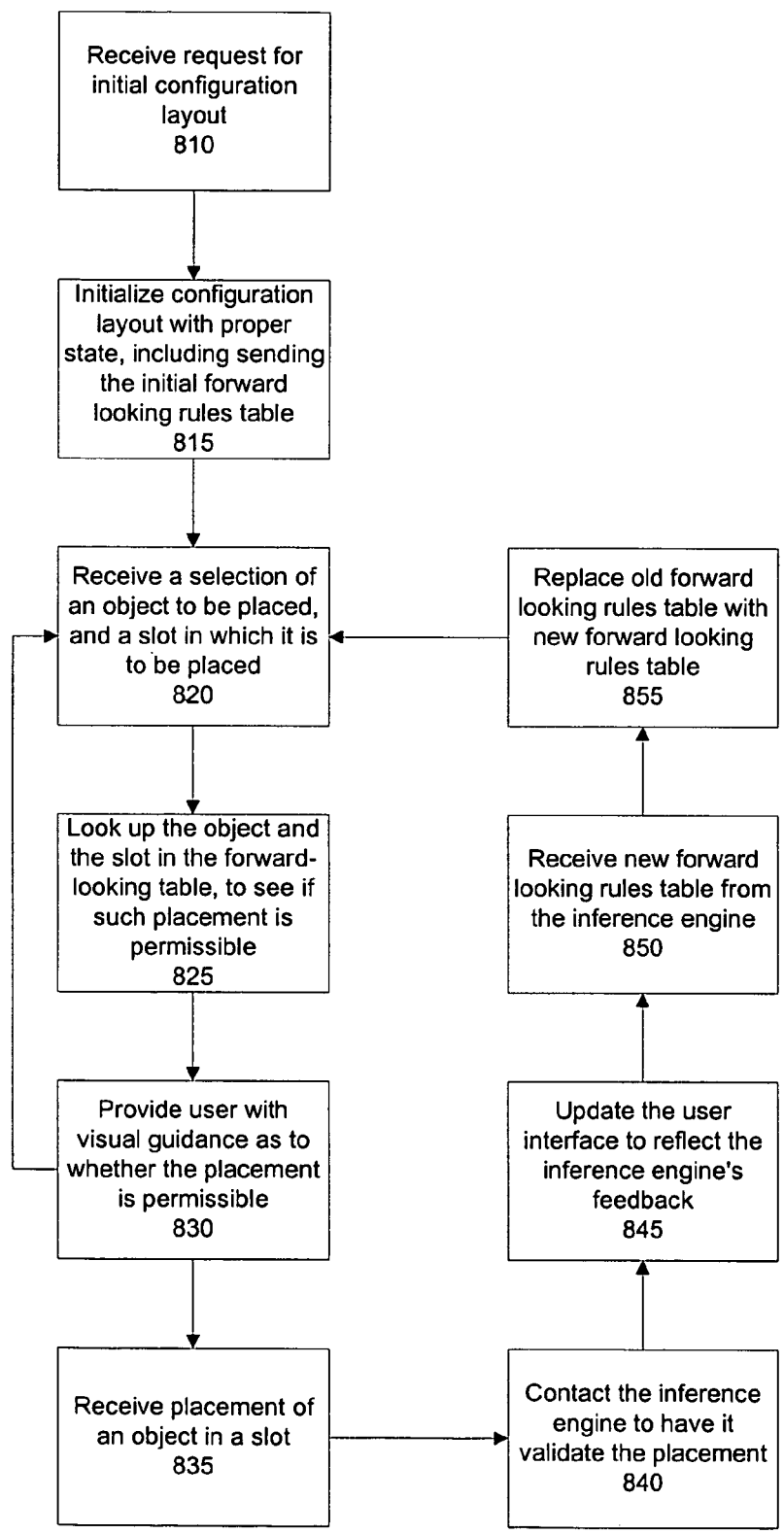
FIG. 8 is a flowchart illustrating the operation of a system in accordance with one embodiment of the present invention.

FIG. 8 is a flowchart illustrating the various steps that are taken by a system in accordance with one embodiment of the present invention. The system first receives 810 a request for an initial configuration layout from the user's web browser. The request includes a request for the donors, the receptors, their positional layout, and the initial configuration (i.e. what objects are in what slots, if any). Upon receiving 810 this request, the system initializes 815 the configuration layout with proper state. A "state" is a set of selected items. The "initial state" is, in one embodiment, a set of items which are selected by default and which are all mutually compatible. The initialization 815 may include sending the initial forward-looking rules table to the user intelligence 140.

Once the initialization 815 is completed, the user interface 110 is ready to receive 820 a selection of a donor object, as well as a receptor slot in which a user plans to place it. The user intelligence 140 may then look up 825 the proposed selection in the forward-looking rules table, to see whether such placement is permissible, or whether it will violate any constraints. Based upon this look up 825, the system may provide 830 visual guidance to the user regarding whether or not the selection and placement is acceptable. The user may, based on this guidance 830, select an alternate donor object and/or an alternate receptor slot. The system may then receive 820 another such selection.

Once the user has determined which object to place and where, the user interface 110 will, in one embodiment, receive 835 the placement of an object in a slot. The inference engine 170 may then be contacted 840 by the user intelligence 140, so that the inference engine 170 can validate or invalidate the placement. The user interface 110 then updates 845 the visual layout to reflect the inference engine's feedback.

Examples of the steps involving the user interface 110 in the system operation described above are provided in FIGS. 4-7 discussed previously. In FIG. 4, it can be seen that a selection of an object to be placed, and slot in which it is to be placed is received 820. After the object and the slot are looked up 825 in the forward-looking rules table, the user is provided 830 with visual guidance as to whether the placement is permissible. In FIG. 4, this placement is not permissible because it violates some forward-looking rules, and this is depicted in the user interface 110 by showing a cross 410 instead of the object 310. However, in one embodiment of the present invention, the user may still be allowed to place the object in receptor 255 if he so chooses. As mentioned above, after the system receives 835 the placement of the object in the slot, the inference engine 170 is contacted 840 to validate the placement. The user interface 110 is then updated 845 to reflect the inference engine's 170 feedback. This updating 845 of the visual interface is visible in FIG. 5, where the object in receptor 252 is also depicted now as a cross 505 to indicate the invalidity of the placement because of the violation of a forward-looking rule. When the user eventually chooses to rectify his placement of the objects, FIG. 7 illustrates how the user interface 110 is updated 845 to reflect the validation, by depicting both the objects 305 and 310.

Referring again to FIG. 8, based upon the user's latest selection and placement, the user intelligence 140 next receives 850 a new forward-looking rules table from the inference engine 170. The old forward-looking rules table is replaced 855 with this new forward-looking rules table. The system may then receive 820 another selection of a donor object to be placed, and of a slot in which it is to be placed.

Figure 9A:
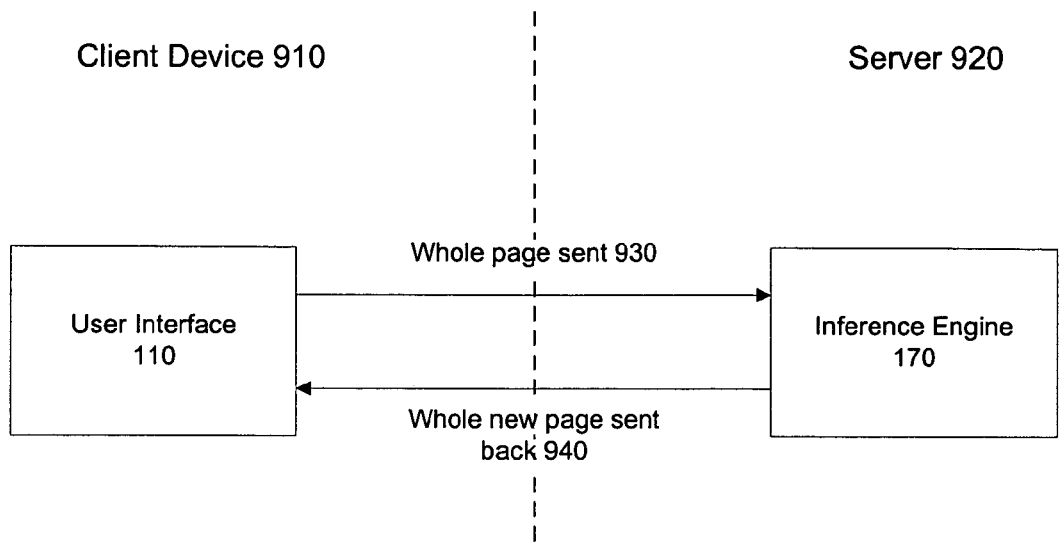
FIG. 9A illustrates the data flow between the client device and a remote server in a conventional system.
Figure 9B:
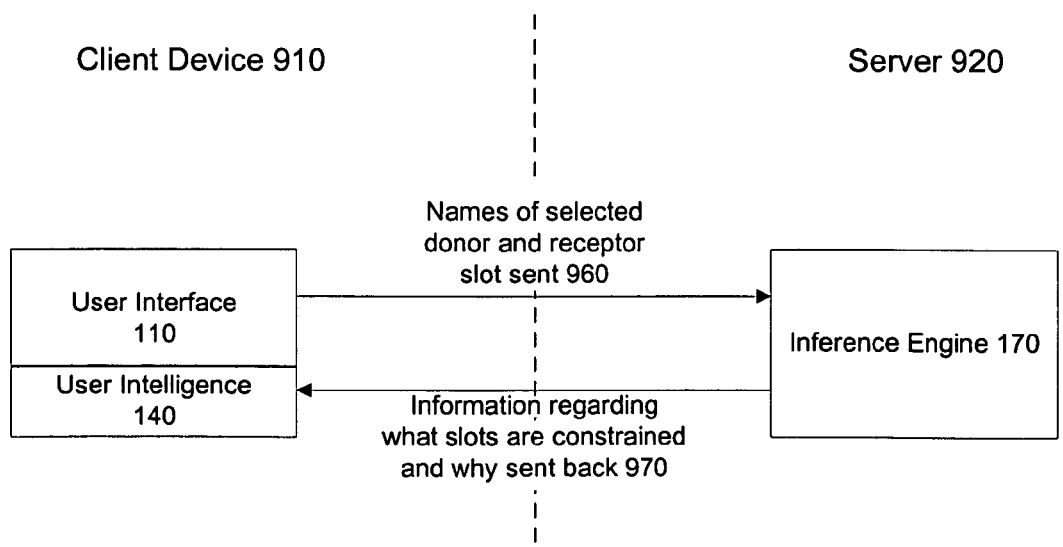
FIG. 9B illustrates the data flow between the client device and a remote server in an embodiment of the present invention.

In one embodiment, a system in accordance with the present invention is implemented over the Internet. In other words, the user interface 110, and the user intelligence 140 may be located on a client device 910 remote from a server 920 on which the inference engine 170 is located. This is illustrated in FIGS. 9A and 9B. The client device 910 may be equipped with a web-browser, and may use it to communicate with the remote server 920 via the Internet. For smooth functioning of a system in accordance with the present invention, information should be communicated back and forth from the remotely situated inference engine 170 at a reasonably high speed. One way of accomplishing this is to reduce the amount of information that needs to go back and forth between the client device 910 and the server 920.

Referring to FIG. 9A, it can be seen that in conventional systems, every time that the user made a selection, the user interface 110 on the client device 910 sends 930 the entire page to the inference engine 170 on the server 920. The inference engine 170 on the server 920, in turn sends 940 an entire new page back to the client device 910. Thus a large amount of information needs to be exchanged between the client device 910 and the remote server 920 each time a selection is made by the user. This resulted in the conventional system being slow and inefficient when the intelligence is placed on a remote server 920 with which the client device 910 communicates over the Internet.

In contrast, a system in accordance with an embodiment of the present invention transfers relatively small amounts of data from the client device 910 to the remote server 920 and vice versa when a user makes a selection. This can be seen by referring to FIG. 9B. When a user makes a selection, the entire web page does not need to be sent over to the remote server 920. Instead, only information regarding the user's selection—that is, which component (donor) the user chose, and which slot (receptor) she chose to place it in—needs to be sent 960 from the client device 910 to the remote server 920. The inference engine 170, in turn, validates the placement, and sends back 970 a new forward-looking rules table containing information regarding what receptor slots are constrained for what objects. Further, in one embodiment, if a user makes a certain constrained selection, the inference engine 170 sends information regarding why the constraint is imposed. Thus the amount of information that goes back and forth between the client device 910 and the remote server 920 is greatly reduced, and a system in accordance with such an embodiment can operate at a much greater speed than the conventional system described above.

Figure 10:
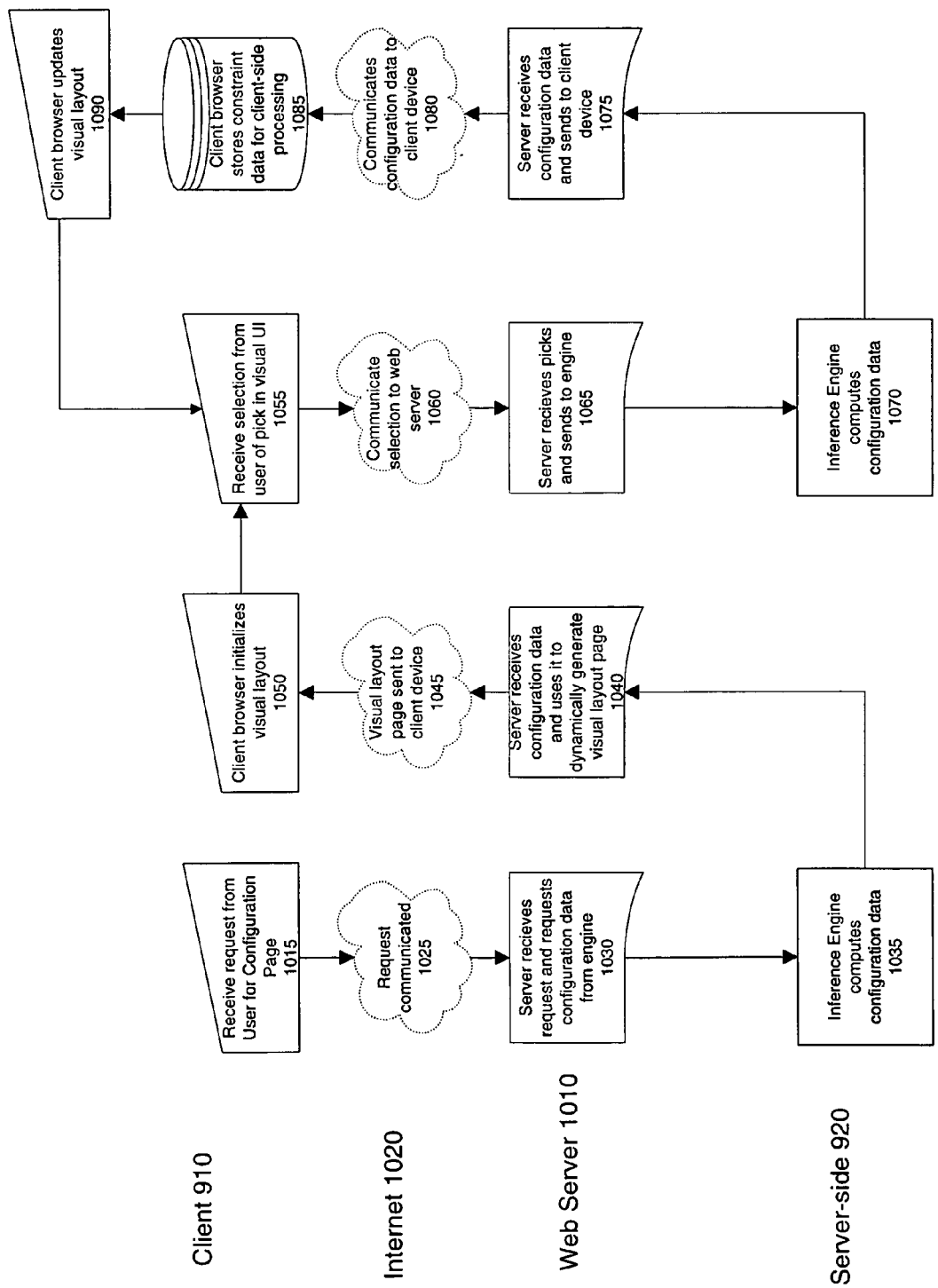
FIG. 10 illustrates the interaction, over the Internet, of different parts of a system in accordance with one embodiment of the present invention.
Figure 1:
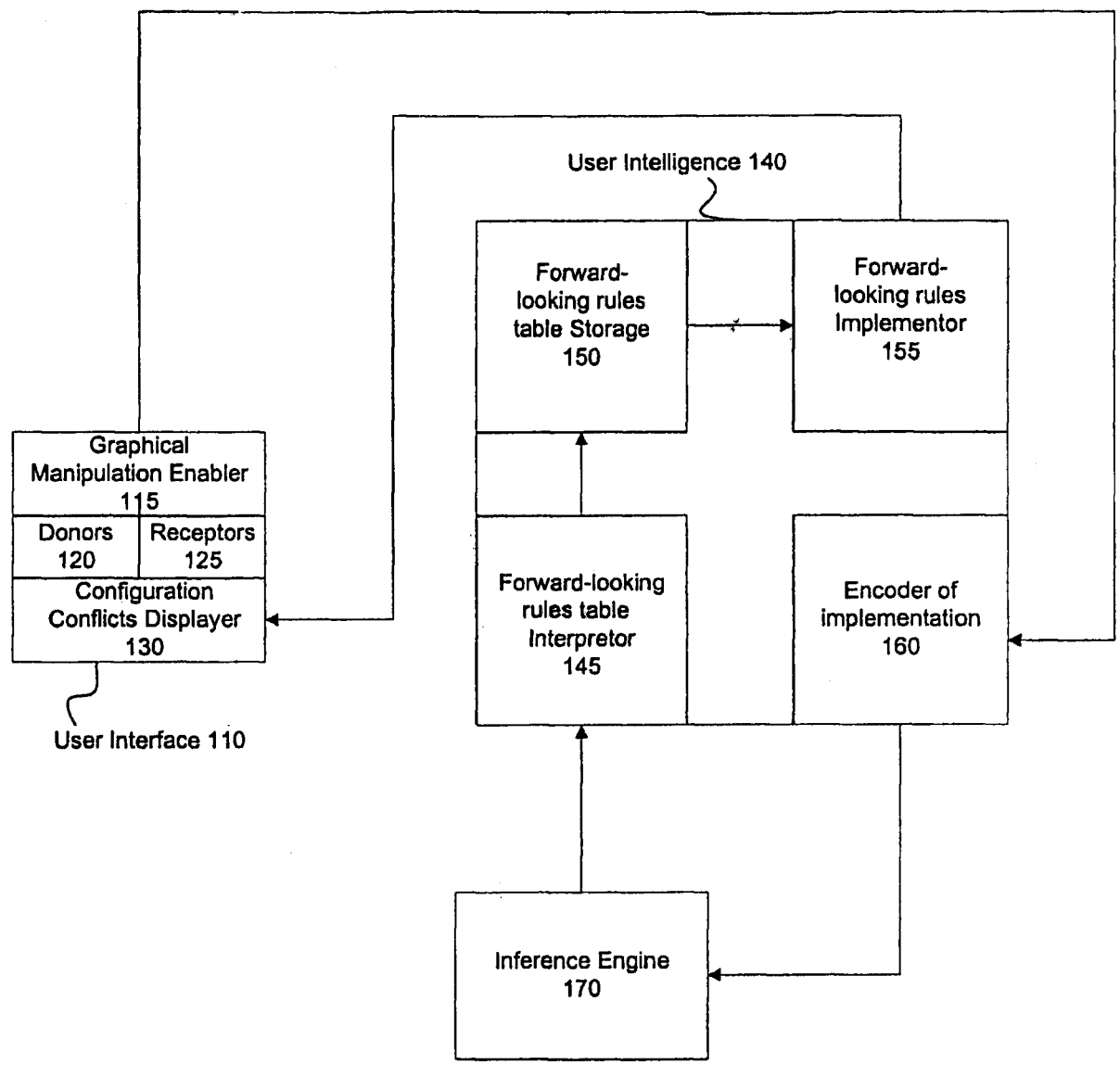

FIG. 10 describes in more detail how a system in accordance with the present invention operates when the client device 910 is connected via the Internet to the server-side 920 inference engine 170. FIG. 10 depicts the client device 910, the server side 920, a web server 1010, and the Internet 1020. In one embodiment, the web server 1010 can be on the same machine as the one on which the inference engine 170 is located. In an alternate embodiment, the web server 1010 may be one a remote server from the one on which the inference engine 170 is located. These two servers may also communicate by means of the Internet.

The client device 910 receives a request 1015 from a user for a configuration page on the client device 910. The request is communicated 1025 via the internet 1020 to the web server 1010. The web server 1010 receives 1030 the request, and requests configuration data from the inference engine 170. The inference engine 170 then computes 1035 the initial configuration data, and the initial forward-looking rules table. The initial configuration data can include initially selected objects/defaults. These defaults could, for instance, be something that the e-store wants to guide the user toward buying. The initial configuration data can also include some initial constraints, if the e-store owners or administrators wanted to constrain something from the outset. The web server 1010 then receives 1040 the configuration data and uses it to dynamically generate a visual layout page. This visual layout page is then sent 1045 to the client device 910 via the Internet 1020. A web browser on the client device 910 then initializes 1050 the visual layout. After the client device 910 receives 1055 a selection from the user of her pick in the visual user interface 110, the internet 1020 communicates 1060 the selection to the web server 1010. The web server 1010 receives 1065 the selection and sends it to the inference engine 170. The inference engine 170 then computes 1070 the new forward-looking rules table based on this selection, which the web server 1010 then receives 1075 and sends to the client device. The internet 1020 communicates 1080 the new forward-looking rules table to the client device 910, and the browser on the client device 910 stores 1085 the new forward-looking rules table, and visually updates 1090 the layout. The system may then receive another pick from the user in the visual user interface 110, and steps 1055 through 1090 may be repeated.

From the above description, it will be apparent that the present invention disclosed herein provides a novel and advantageous method and system for visual configuration of selectable components. As will be understood by those familiar with the art, the invention may be embodied in other specific forms without departing from the spirit or essential characteristics thereof. Likewise, the particular capitalization or naming of the modules, protocols, features, attributes, or any other aspect is not mandatory or significant, and the mechanisms that implement the invention or its features may have different names or formats. The foregoing discussion discloses and describes merely exemplary methods and embodiments of the present invention. Accordingly, the disclosure of the present invention is intended to be illustrative, but not limiting, of the scope of the invention, which is set forth in the following claims.

PENTIUM™ is a trademark of Intel Corporation, of Santa Clara, Calif. USA.

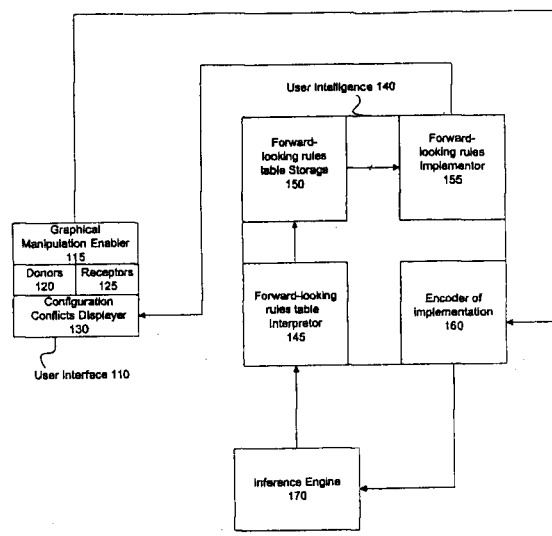

We claim:

1. A method for visually configuring a product by placing a plurality of selectable components into a plurality of slots, comprising:
   (a) initializing a configuration layout with proper state;
   (b) receiving a selection of one of the plurality of selectable objects, and of one of the plurality of slots in which the selected object may be placed;
   (c) providing visual feedback indicating a validity of the selections;
   (d) receiving a placement of the selected object;
   (e) receiving input regarding the placement from a remote inference engine;
   (f) updating the visual feedback as needed based on the received input; and
   (g) repeating steps (b) through (f) until no more selections are received.

2. The method of claim 1, wherein the selection of one of the plurality of selectable objects affects a validity of a selection of another of the plurality of selectable objects and a selection of another of the plurality of slots.

3. The method of claim 1, wherein the selection of one of the plurality of selectable objects occurred prior to the selection of one of the plurality of slots.

4. A method for visually configuring a product by placing a plurality of selectable components into a plurality of slots, comprising:
   (a) initializing a configuration layout with proper state;
   (b) receiving a selection of one of the plurality of selectable objects, and of one of the plurality of slots in which the selected object may be placed;
   (c) looking up a set of constraints on the placement of the selected object;
   (d) receiving a placement of the selected object;
   (e) receiving input regarding the placement from a remote inference engine;
   (f) implementing the received input;
   (g) storing a new set of constraints based on the placement of the selected object; and
   (h) repeating steps (b) through (g) until no more selections are received.

5. The method of claim 4, further comprising:
   transmitting information regarding the placement of the object to the inference engine.

6. The method of claim 4, wherein the step of looking up constraints comprises looking up a forward-looking rules table.

7. The method of claim 6, wherein the step of storing a new set of constraints comprises storing a new forward-looking rules table.

8. The method of claim 4, wherein the input is received from an inference engine.

9. The method of claim 4, wherein the selection of one of the plurality of selectable objects, and of a slot in which the selected object may be placed, is received via a user interface.

10. The method of claim 4, wherein the received input is implemented in a user interface.

11. A computer implemented system for visually configuring a product from a plurality of selectable components, comprising:
   a user interface for displaying the plurality of selectable components and a plurality of slots into which the plurality of selectable components can be placed; and
   a user intelligence communicatively coupled to the user interface, for receiving a set of constraints from a remote inference engine and implementing the set of constraints;

wherein the user intelligence comprises:
- an interpretor for receiving a set of constraints from an inference engine;
- a storage for storing the set of constraints;
- an implementor for implementing the forward-looking rules stored in the table; and
- an encoder for encoding and sending data regarding a user's current selection from the plurality of donors and the plurality of receptors to the inference engine.

12. The system of claim 11, wherein the visual user interface comprises: donors depicting the plurality of selectable components;
- receptors depicting the plurality of slots into which the donors can be placed;
- a graphical manipulation enabler for implementing drag and drop behavior of the donors into the receptors; and
- a configuration conflicts displayer, for updating a visual display responsive to at least one of the plurality of donors being put into at least one of the plurality of slots such that at least one constraint stored on the user intelligence is violated.

13. A computer program embodied in a tangible medium and capable of being executed by a computer for performing a method for visually configuring a product by placing a plurality of selectable components into a plurality of slots, comprising:
- (a) initializing a configuration layout with proper state;
- (b) receiving a selection of one of the plurality of selectable objects, and of one of the plurality of slots in which the selected object may be placed;
- (c) providing visual feedback indicating a validity of the selections;
- (d) receiving a placement of the selected object;
- (e) receiving input regarding the placement from a remote inference engine;
- (f) updating the visual feedback as needed based on the received input; and
- (g) repeating steps (b) through (f) until no more selections are received.

14. A computer program embodied in a tangible medium and capable of being executed by a computer for performing a method for visually configuring a product by placing a plurality of selectable components into a plurality of slots, comprising:
- (a) initializing a configuration layout with proper state;
- (b) receiving a selection of one of the plurality of selectable objects, and of one of the plurality of slots in which the selected object may be placed;
- (c) looking up a set of constraints on the placement of the selected object;
- (d) receiving a placement of the selected object;
- (e) receiving input regarding the placement from a remote inference engine;
- (f) implementing the received input;
- (g) storing a new set of constraints based on the placement of the selected object; and
- (h) repeating steps (b) through (g) until no more selections are received.

15. A method of visually configuring a product by placing one or more of a plurality of objects into one or more slots, subject to a plurality of configuration rules, the method comprising:
- (a) providing the plurality of objects and a predetermined product configuration layout to a client device for display within a graphical user interface, the product configuration layout including the one or more slots;
- (b) receiving, from the client device, a selection of one of the plurality of objects displayed within the graphical user interface and a selection of one of the one or more slots, the selection of the one of the plurality of objects and the selection of one of the one or more slots being for modification of the product configuration layout;
- (c) causing the graphical user interface to indicate that the selected object cannot be placed in the selected slot, if placing the selected object in the selected slot would violate one or more of the plurality of configuration rules; and
- (d) causing the graphical user interface to show the selected object within the selected slot, if placing the selected object in the selected slot would not violate any of the plurality of configuration rules.

16. The method of claim 15, wherein the plurality of configuration rules allow a finite number of valid product configuration layouts.

17. The method of claim 15 wherein a forward-looking rules table is used to determine if placing the selected object in the selected slot would violate one or more of the plurality of configuration rules.

18. The method of claim 15 wherein a user intelligence stored on the client device is used to determine if placing the selected object in the selected slot would violate one or more of the plurality of configuration rules.

19. The method of claim 15 wherein an inference engine on a server is used to determine if placing the selected object in the selected slot would violate one or more of the plurality of configuration rules, the server being configured for receiving the selection of one of the plurality of objects.

20. The method of claim 15 wherein the selection of one of the plurality of objects and the selection of one of the one or more slots includes dragging the one of the plurality of objects to the one of the one or more slots within, the graphical user interface.

21. The method of claim 15 wherein the selection of one of the plurality of objects and the selection of one of the one or more slots includes dragging the one of the plurality of objects to the one of the one or more slots within the graphical user interface, and wherein causing the graphical user interface to indicate that the selected object cannot be placed in the selected slot includes not allowing the dragged one of the plurality of objects to be dropped in the one of the one or more slots.

22. The method of claim 15 wherein the configuration layout is representative of a physical layout of the product.

23. The method of claim 15, wherein causing the graphical interface to indicate that the selected object cannot be placed in the selected slot occurs while attempting to place the selected object in the selected slot.

24. A method of configuring a product for purchase, the method comprising:
- selecting the product for purchase, the product having a plurality of alternative configurations, the plurality of alternative configurations being limited by a plurality of configuration rules;
- viewing a first configuration of the plurality of alternative configurations and a plurality of objects, within a graphical user interface, the viewed first configuration including one or more slots within which at least one of the plurality of objects may be placed;

specifying a second configuration of the selected product by selecting a first of the plurality of objects for placement in a first of the one or more slots, the placement of the first of the plurality of objects in the first of the one or more slots being limited by a subset of the plurality of configuration rules, the selection of the first of the plurality of objects being made using the graphical user interface.

25. The method of claim 24, wherein the subset of the plurality of configuration rules is determined based on the first configuration.

26. The method of claim 24 further including selecting the first of the one or more slots by dragging the first of the plurality of objects to the first of the one or more slots, within the graphical user interface.

27. The method of claim 24, wherein the plurality of alternative configurations includes a finite number of alternative configurations, the finite number being determined in part by the plurality of configuration rules.

* * * * *

UNITED STATES PATENT AND TRADEMARK OFFICE
CERTIFICATE OF CORRECTION

| | | |
|---|---|---|
| PATENT NO. | : 7,568,155 B1 | Page 1 of 3 |
| APPLICATION NO. | : 09/636418 | |
| DATED | : July 28, 2009 | |
| INVENTOR(S) | : Axe et al. | |

It is certified that error appears in the above-identified patent and that said Letters Patent is hereby corrected as shown below:

The title page showing the illustrative figure should be deleted to be replaced with the attached title page.

The drawing sheet, consisting of Fig. 1, should be deleted to be replaced with the drawing sheet, consisting of Fig. 1, as shown on the attached page.

On sheet 10 of 10, in Figure 10, Ref. Numeral 1030, line 1, delete "recieves" and insert -- receives --, therefor.

On sheet 10 of 10, in Figure 10, Ref. Numeral 1065, line 1, delete "recieves" and insert -- receives --, therefor.

In column 7, line 1, delete "auction" and insert -- action --, therefor.

In column 12, line 4, in claim 15, after "selection of" delete "the".

Signed and Sealed this

Twenty-ninth Day of June, 2010

David J. Kappos
*Director of the United States Patent and Trademark Office*

CERTIFICATE OF CORRECTION (continued)

(12) United States Patent
Axe et al.

(10) Patent No.: US 7,568,155 B1
(45) Date of Patent: Jul. 28, 2009

(54) VISUAL CONFIGURATOR

(75) Inventors: Christopher E. Axe, San Jose, CA (US); Marco S. Casalaina, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2135 days.

(21) Appl. No.: 09/636,418

(22) Filed: Aug. 10, 2000

(51) Int. Cl.
*G06F 17/00* (2006.01)

(52) U.S. Cl. ............... 715/246; 715/243; 715/244

(58) Field of Classification Search .......... 715/517, 715/518, 520, 521, 539, 200, 243, 244, 246, 715/247, 272; 717/107
See application file for complete search history.

(56) References Cited

U.S. PATENT DOCUMENTS

| | | | |
|---|---|---|---|
| 5,438,512 A * | 8/1995 | Mantha et al. | 715/517 |
| 5,499,366 A * | 3/1996 | Rosenberg et al. | 707/4 |
| 5,600,771 A * | 2/1997 | Hayashi et al. | 715/517 |
| 5,669,006 A * | 9/1997 | Joskowicz et al. | 715/517 |
| 5,745,765 A * | 4/1998 | Paseman | 717/107 |
| 5,845,303 A * | 12/1998 | Templeman | 715/517 |
| 5,953,733 A * | 9/1999 | Langford-Wilson | 715/517 |
| 6,038,597 A * | 3/2000 | Van Wyngarden | 709/219 |
| 6,161,114 A * | 12/2000 | King et al. | 715/517 |
| 6,167,383 A * | 12/2000 | Henson | 705/26 |
| 6,216,142 B1 * | 4/2001 | Iwasaki | 715/517 |
| 6,288,719 B1 * | 9/2001 | Squilla et al. | 345/805 |
| 6,434,579 B1 * | 8/2002 | Shaffer et al. | 715/520 |
| 6,578,013 B1 * | 6/2003 | Davis et al. | 705/26 |
| 6,596,032 B2 * | 7/2003 | Nojima et al. | 715/517 |
| 6,598,223 B1 * | 7/2003 | Vrhel et al. | 717/174 |
| 6,694,365 B1 * | 2/2004 | Wyngarden | 709/225 |

OTHER PUBLICATIONS

Statement Regarding Demonstration of a Prototype Visual Configurator; Feb. 4, 2002.
Stacy, Don; "Visio-based Configurator Overview", Feb. 18, 1998.

* cited by examiner

*Primary Examiner*—Stephen S Hong
*Assistant Examiner*—Gregory J Vaughn
(74) *Attorney, Agent, or Firm*—Townsend and Townsend and Crew LLP

(57) ABSTRACT

A method, system, and computer program product for addressing a general class of configuration problems requiring visual placement. Such configuration problems are solved as a single group using a visual user interface which guides the users' behavior. The present invention may be implemented over the Internet for rapid and efficient distribution without any additional software on the client side other than a web browser. The inference engine may be on a remote server. The client side device may include a visual user interface as well as a small amount of user side intelligence. In one embodiment, a visual interface on the client device helps the user create a product comprised of selectable components, where each component is placed where the user wants it. Since the client device contains some amount of user intelligence, the client device does not need to send an entire web page to the inference engine, and receive an entire new web page from the inference engine, every time a user selects a component. Instead, once a user makes a selection, the client device can merely send over to the inference engine, the component selected, and the desired placement of the component. The inference engine, in turn, can merely send over information regarding which slots are constrained and how. The client device may include a web-browser, via which it can communicate with the inference engine over the Internet.

27 Claims, 10 Drawing Sheets